United States Patent
Kiel

(10) Patent No.: US 12,476,589 B2
(45) Date of Patent: Nov. 18, 2025

(54) METHOD FOR DETERMINING AN OPERATING PARAMETER OF A PV INSTALLATION, PV INSTALLATION HAVING AN INVERTER AND INVERTER FOR SUCH A PV INSTALLATION

(71) Applicant: SMA Solar Technology AG, Niestetal (DE)

(72) Inventor: Edwin Kiel, Gleichen (DE)

(73) Assignee: SMA Solar Technology AG, Niestetal (DE)

(*) Notice: Subject to any disclaimer, the term of this patent is extended or adjusted under 35 U.S.C. 154(b) by 0 days.

(21) Appl. No.: 18/813,192

(22) Filed: Aug. 23, 2024

(65) Prior Publication Data

US 2024/0421765 A1    Dec. 19, 2024

Related U.S. Application Data

(63) Continuation of application No. 17/746,040, filed on May 17, 2022, now Pat. No. 12,088,249, and a
(Continued)

(30) Foreign Application Priority Data

Nov. 18, 2019   (DE) .................. 10 2019 131 019.9

(51) Int. Cl.
 *H02S 50/10*   (2014.01)
 *H02S 40/32*   (2014.01)
(52) U.S. Cl.
 CPC .............. *H02S 50/10* (2014.12); *H02S 40/32* (2014.12)
(58) Field of Classification Search
 CPC ................................ H02S 50/10; H02S 40/32
 See application file for complete search history.

(56) References Cited

U.S. PATENT DOCUMENTS

2009/0121549 A1*  5/2009  Leonard .................. H02J 3/381
                                                                            307/51
2009/0284078 A1  11/2009  Zhang et al.
(Continued)

FOREIGN PATENT DOCUMENTS

DE    102018102767 A1   8/2019

OTHER PUBLICATIONS

International Search Report Dated Jan. 18, 2021 for International Application No. PCT/EP2020/080359.
(Continued)

*Primary Examiner* — Jayne L Mershon
(74) *Attorney, Agent, or Firm* — Eschweiler & Potashnik, LLC

(57) ABSTRACT

A method and associated system for determining an operating parameter of a PV installation having a plurality of PV modules is disclosed. The PV modules each include a shutdown apparatus connected to a transmission apparatus of the PV installation and has a feed-in operation and a shutdown operation. At least one PV module is equipped with a power-optimizing device which is configured to set an operating point of the PV module in an optimizing operation. The method includes determining a first total electrical power of the PV modules in a non-optimizing operation and in the feed-in operation of the shutdown apparatuses, and determining a second total electrical power of the PV modules in the optimizing operation and in the feed-in operation of the shutdown apparatuses. The method includes determining the operating parameter using a difference between the determined first and second total electrical powers.

19 Claims, 3 Drawing Sheets

Related U.S. Application Data continuation of application No. PCT/EP2020/080359, filed on Oct. 29, 2020.

(56) References Cited

U.S. PATENT DOCUMENTS

2018/0366945 A1* 12/2018 Braginsky ............... H02S 10/00
2021/0126580 A1*  4/2021 Moslehi ................. H02S 50/10

OTHER PUBLICATIONS

Non-Final Office Action dated Feb. 1, 2024, for U.S. Appl. No. 17/746,040.
Notice of Allowance dated May 15, 2024, for U.S. Appl. No. 17/746,040.

* cited by examiner

METHOD FOR DETERMINING AN OPERATING PARAMETER OF A PV INSTALLATION, PV INSTALLATION HAVING AN INVERTER AND INVERTER FOR SUCH A PV INSTALLATION

CROSS REFERENCE TO RELATED APPLICATIONS

This Application is a continuation of U.S. application Ser. No. 17/746,040, filed on May 17, 2022, which is a continuation of International Patent Application number PCT/EP2020/080359, filed on Oct. 29, 2020, which claims priority to German Application number 10 2019 131 019.9, filed on Nov. 18, 2019. The contents of the above-referenced Patent Applications are hereby incorporated by reference in their entirety.

FIELD

The disclosure relates to a method for determining an operating parameter of a photovoltaic installation (PV installation) having a plurality of photovoltaic modules (PV modules), each of which comprises a shutdown apparatus that has a feed-in operation and a shutdown operation.

The disclosure also relates to such a PV installation having an inverter and to an inverter for such a PV installation.

BACKGROUND

PV installations and inverters of the type mentioned above are known from the prior art. Photovoltaic installations, which are abbreviated to PV installations in the text which follows, generate electrical energy from sunlight. In general, a plurality of photovoltaic modules, which are abbreviated to PV modules in the text which follows, are electrically connected to one another to form a solar generator for this purpose, with the PV modules themselves in turn also being an interconnection of electrical solar cells. Solar cells are known apparatuses which convert sunlight into electrical energy. Here, a p-n transition in a semiconductor material such as silicon is used to separate the charge carrier pairs generated by the incident sunlight and to provide the same as a DC voltage at the contacts of the solar cell. The solar generator is generally connected to an inverter on the DC side, the inverter being used to convert the DC voltage supplied by the solar generator into an AC voltage. The inverter can feed this AC voltage provided at its AC output into a power supply grid directly or via an intermediate transformer. The power supply grid may be, for example, a public power supply grid or a limited island grid. In order to increase the DC voltage provided by the solar generator, the PV modules can be connected together to form one or more so-called strings that themselves are connected together in parallel, each string being constructed from a series connection of PV modules.

In certain applications, it is necessary for the PV modules to be able to be shut down in an emergency, for example, to enable the fire service to safely extinguish a fire in the region of the PV installation. For this purpose, the PV modules have so-called shutdown apparatuses which, as a result of a centrally transmitted shutdown signal, switch the PV modules off at their respective module output. A so-called power line communication can be used for this purpose, for example, in which the communication signals are transmitted between the inverter and the PV modules via the lines for the electrical power transmission that are already present. Both bidirectional and unidirectional communication is considered for the communication. To save costs, unidirectional communication to the shutdown apparatuses is widespread, in which case it is necessary to arrange a corresponding central transmission apparatus and corresponding reception devices which are close to the module.

In order to obtain maximum electrical power from the photovoltaic modules, it is necessary to keep the operating voltage of the individual PV modules at an operating point of maximum power (Maximum Power Point=MPP). For this purpose, so-called MPP tracking can be carried out by the respective inverter, that is to say modulation of its input voltage with the aim of finding the MPP. The MPP of a PV module depends on its current operating conditions, in particular its current temperature and the current irradiation on the PV module. Since the current through all PV modules arranged in a string is basically the same, all PV modules in a string can only be operated simultaneously at their respective MPP if their characteristic curves, that is to say the dependence of their power on their operating voltage or their operating current, are the same at least to the extent that the characteristic curves have their maxima at the same current. In a few cases, this is not the case. To this end, it is known to connect individual or all PV modules in a string to neighbouring PV modules in the string via a power-optimizing device comprised by the PV module. In optimizing operation of this power-optimizing device, it is possible to operate the PV module by means of the power-optimizing device independently of a current flowing in the string at an operating point of maximum power (MPP) so that a total power of the solar generator can be further increased through the MPP tracker of the inverter in connection with the power-optimizing devices. A respective bypass diode is arranged in parallel with the PV modules, the diode becoming conductive if a PV module fails or if the PV module's power is too low and diverting the current to the PV module so as not to adversely affect the total power of the solar generator.

Basically, the installation operator has a need for information about the state and/or the power of the PV modules. To monitor the PV modules, cost-intensive solutions in each PV module provide a sensor system for measuring the current operating parameters such as current and voltage values of the PV module, with the PV modules being connected to a central control unit of the PV installation via bidirectional communication. This requires a great deal of equipment, with the result that monitoring of the PV modules is often completely dispensed with.

The publication US 2009/0284078 A1 discloses a PV installation having a system control circuit and a number of local control circuits. The system control circuit includes a system operating frequency, while each local control circuit includes a local operating frequency. Each of the local operating frequencies is spaced at least a predefined distance apart from the system operating frequency.

Document DE 10 2018 102767 A1 discloses a method for determining a property of a PV module connected to a PV string of a PV installation via an activation unit. The property is determined in this case by means of a sensor unit assigned to the PV string and by means of unidirectional communication from a transmission unit remote from the generator to a reception unit assigned to the PV module. In the method, an activation state of at least one PV module is selectively changed by the activation unit. In this case, the change takes place from a first activation state, which suppresses a power draw from the associated PV module, to a second activation state, which enables a power draw from the associated PV module.

SUMMARY

The disclosure is directed to a method of the type mentioned at the beginning, with which an operating parameter of a PV installation of the type mentioned at the beginning can be determined with particularly little outlay in terms of equipment, the technical information content of said operating parameter representing a good compromise between costly monitoring of the PV modules and doing without them altogether.

The disclosure is directed to a method for determining an operating parameter. According to one embodiment, in a first method act in a non-optimizing operation of the power-optimizing devices and in a feed-in operation of the shutdown apparatuses, a first total electrical power of the PV modules is determined and, in a second method act in optimizing operation of the power-optimizing devices and in feed-in operation of the shutdown apparatuses, a second total electrical power of the PV modules is determined. The operating parameter is determined by means of the difference between the two total powers.

Since, according to one embodiment of the disclosure, the total power of the solar generator is determined in different operating states, the sensor system that is already present in the inverter for measuring the current and voltage values provided by the solar generator can be used to measure said total power, which means that it is possible to dispense with complex sensors in each PV module. Specifically, in one embodiment, the determination of the first and the second total power of the PV modules can therefore be carried out by means of a sensor device which is configured to measure a total electrical power supplied by the PV modules to the inverter. In addition, the sensor device can be configured to transmit measured values to a control apparatus of the inverter of the PV installation and be communicatively connected to it. Advantageously, in one embodiment the sensor device as well as the control device can be included in the inverter. In addition, there is no need for bidirectional communication between the inverter and the PV modules in the method according to the disclosure, but only unidirectional communication from the inverter to the PV modules, that can be implemented using less equipment. The transmission apparatus required for this can be included in the inverter. In particular, this may be a transmission apparatus which at the same time is also to be kept available for the activation of the shutdown apparatuses anyway and, in the present case, has also been upgraded for use in the method according to the disclosure. This further reduces the outlay on equipment in the method.

Using the operating parameter determined according to the disclosure, an additional yield of electrical power generated by the power-optimized devices can be identified and consequently at least one overall operation of the power-optimizing devices can be monitored. In one embodiment, to determine the operating parameter, among other things, the total power supplied by the solar generator is measured in the two specified different operating states of the power-optimizing devices of the first and second method acts. The sensor device used for this is connected to a control apparatus of the inverter for reading in the measured values. The transmission apparatus is also connected to this control apparatus, since the measurements are carried out for the method in one embodiment when the operating state of the power-optimizing devices has changed and is therefore coordinated with one another. The transmission apparatus which is to be kept ready for activating the shutdown apparatuses and which may be used for the method according to the disclosure can be used as the transmission apparatus in one embodiment. Said transmission apparatus is generally connected to the control apparatus of the inverter anyway, since it must also be possible for the control apparatus of the inverter itself to transmit a shutdown command to the shutdown apparatuses via a transmission apparatus in the event of a situation, detected by the inverter, that requires the PV modules to be shut down. The method can thus be implemented with little equipment. At this point, it should also be noted that, in the method according to the disclosure, the second method act can take place before or after the first method act. In addition, the operating parameter does not have to correspond to the difference between the two total powers measured, but rather only has to be determined by means of the difference.

Advantageous embodiments of the disclosure are specified in the following description and in the dependent claims, the features of which may be applied individually and in any combination with each other.

According to one embodiment of the disclosure, the two method acts can be carried out consecutively several times over a period of time, wherein the operating parameter is an average value of individual values averaged over the period of time which in turn are determined by means of the respective differences between the two total powers.

In one embodiment, the period of time may be, for example, the time period from sunrise to sunset on a day. In this case, the operating parameter can be an estimate of an additional yield of electrical energy generated by the power-optimizing devices on this day, which is made accessible to the installation operator via an interface of the inverter to a control room.

It can also be considered in one embodiment that, in the first method act, the optimizing operation of all power-optimizing devices of the PV installation is transferred to a non-optimizing operation as a result of a shutdown signal transmitted by the transmission apparatus to all PV modules, wherein the shutdown signal is received by a reception device of each PV module.

In one embodiment, the shutdown signal may be, for example, a real signal with the appropriate information content to perform a shutdown action or the absence of a keep-alive signal, with the absence of the signal being interpreted by the reception devices as a shutdown signal. Both variants are possible and should fall under the wording shutdown signal.

Furthermore, in one embodiment, as a result of the reception of the shutdown signal by the reception devices of the PV modules, the shutdown apparatuses change to shutdown operation and, in the case of the PV modules with a power-optimizing device, change to non-optimizing operation. The transmission apparatus then sends a feed-in signal to all PV modules, wherein, as a result of the reception of the feed-in signal by the reception devices of the PV modules, the shutdown apparatuses change to feed-in operation and, in the case of PV modules with a power-optimizing device, the device resumes the optimizing operation with a time delay, and the first total electrical power is measured after the change in operation of the shutdown apparatuses back to the feed-in operation and before the change in operation of the power-optimizing devices to the optimizing operation.

In one embodiment, the shutdown signal may be a standard shutdown signal for the shutdown apparatuses. The disclosure can thus be based on the unidirectional communication from the inverter to the PV modules for the shutdown apparatuses. For this purpose, in one embodiment the power-optimizing devices can be communicatively connected to the reception devices of the shutdown apparatuses or to a controller for the shutdown apparatuses. As a result of the reception of the shutdown signal, the power-optimizing devices change to a non-optimizing operation and, as a result of the reception of a feed-in signal, the power-optimizing devices change to an optimizing operation after a specified time delay. Since in one embodiment the controller of the shutdown apparatuses cannot provide a predetermined time delay for the operating change of the shutdown apparatuses, the interruption of the feed-in operation of the PV modules can be kept low or negligible by rapid succession of the feed-in signal to the shutdown signal. To determine the operating parameter according to the disclosure, the operating change of the shutdown apparatus from feed-in operation to shutdown operation and back to feed-in operation can thus be a real change in operation of the shutdown apparatus or, in order to minimize losses due to the inertia of the system, can only take place to a limited extent so that, due to the inertia of the system, the feed-in operation of the PV module is interrupted only very briefly or not at all and the optimizing operation of the power-optimizing devices is only interrupted in the case of PV modules with a power-optimizing device. The measurement time for the first total power is matched to the predetermined time delay so that this occurs when the PV modules are in feed-in operation and before the resumption of the optimizing operation of the power-optimizing devices. The measurement time for the second total electrical power can take place before the shutdown signal is sent or after the resumption of the optimizing operation of the power-optimizing devices, for example, in order to carry out the measurement of the two total electrical powers under approximately the same ambient conditions.

In one embodiment, it is provided that, as a result of the reception of the shutdown signal by the reception device of the PV modules, the operation of the shutdown apparatuses remains unaffected thereby, wherein, for the PV modules with a power-optimizing device, these modules cease the optimizing operation and the first total electrical power is measured after the optimizing operation has been ceased and before it is resumed.

The shutdown signal according to one embodiment of the disclosure thus does not correspond to a standard shutdown signal for the shutdown apparatuses since it does not affect the operation of the shutdown apparatuses. The shutdown signal can, for example, correspond to the standard shutdown signal with an additional bit at the end of the signal. The embodiment of the disclosure can in this case use the transmission apparatus that is present anyway for the communication of the inverter with the shutdown apparatuses of the PV modules so that the outlay on equipment is reduced. The embodiment of the disclosure can also use the reception devices that are provided anyway for the shutdown apparatuses, with the power-optimizing devices being communicatively connected to the respective reception device or the controller of the respective shutdown apparatus. However, the power-optimizing devices could also each have their own reception device and their own controller independently of the shutdown apparatuses. Since in one embodiment the power-optimizing devices are not subject to the same standards as the shutdown apparatuses and for this reason can be switched on again without having to wait for a feed-in signal from the transmission apparatus, a time period can also be specified in this embodiment of the disclosure, after which the power-optimizing devices are automatically instructed by the controller of the module electronics to resume the optimizing operation. The point in time at which the first total electrical power is measured is set by the control apparatus of the inverter according to the specified time period before it has elapsed. Alternatively, in one embodiment the transmission apparatus could also send a switch-on signal, which leaves the operation of the shutdown apparatuses unaffected and causes the controller of the power-optimizing devices to switch them back to optimizing operation.

Another embodiment of the disclosure is directed to an inverter of the type mentioned at the outset for such a photovoltaic installation, which can be used in the method or methods described herein.

The inverter, according to one embodiment, comprises a DC-side connection for at least one PV module, an AC-side connection for a power supply grid, an inverter bridge for converting DC voltage into AC voltage, a transmission apparatus and a control apparatus activating the transmission apparatus. The control apparatus is configured to control the operation of the inverter and an unidirectional communication between the inverter and the PV modules via the transmission apparatus. In one embodiment, the control apparatus is configured to provide unidirectional communication as control signals between the inverter and the PV modules via the transmission apparatus. The inverter also comprises a sensor device which is configured to measure a total electrical power supplied by the PV modules to the inverter and is communicatively connected to the control apparatus for transmission of the measured values to the latter.

In one embodiment, the inverter is configured to provide and transmit the signals to the PV modules, to measure the total powers and to determine the operating parameter, for example, according to various methods described herein.

An inverter designed for an emergency shutdown of the PV modules by means of unidirectional communication can thus be upgraded for use in the method or methods described herein by designing and setting up the control apparatus of the inverter accordingly, since the sensor device for measuring a total power of the connected PV modules is available as standard in every PV inverter.

In one embodiment, it can also be provided that the inverter comprises an interface which is configured for transmission of the operating parameter.

For example, the operating parameter can be made available via this interface to a control room of the PV installation.

Another embodiment of the disclosure is directed to a photovoltaic installation, which is configured to carry out the method or methods described herein.

BRIEF DESCRIPTION OF DRAWINGS

Further expedient embodiments and advantages of the disclosure are the subject matter of the description of exemplary embodiments of the disclosure with reference to the figures of the drawing, the same reference signs referring to functionally identical components.

In the figures.

DETAILED DESCRIPTION

The disclosure relates to a method for determining an operating parameter of a photovoltaic installation (PV installation) having a plurality of photovoltaic modules (PV modules), each of which comprises a shutdown apparatus, which is communicatively connected to a transmission apparatus of the PV installation, wherein the shutdown apparatuses each have feed-in operation and shutdown operation. At least one of the PV modules of the PV installation is equipped with a power-optimizing device which is set up and designed to set an operating point of the PV module in an optimizing operating mode (optimizing operation). Such PV installations each comprise at least one inverter.

The disclosure also relates to such a PV installation having an inverter and to an inverter for such a PV installation.

Figure 1:
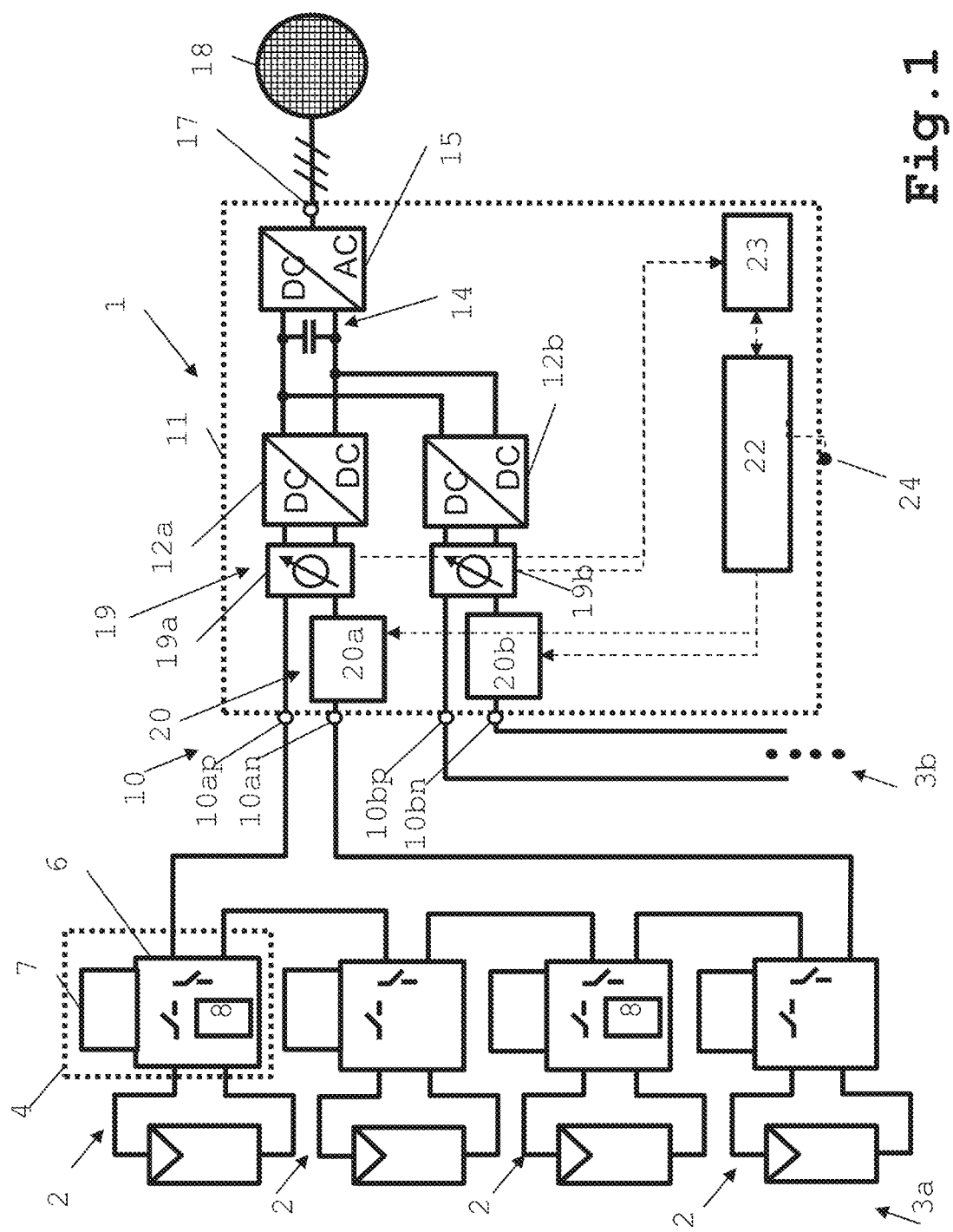
FIG. 1 schematically shows a PV installation according to a first exemplary embodiment of the disclosure, FIG. 2 schematically shows a PV module having a power-optimizing device and a shutdown apparatus according to a second exemplary embodiment of the disclosure.

FIG. 1 schematically shows a PV installation 1 according to a first example embodiment of the disclosure. The PV installation 1 shown comprises a plurality of PV modules 2, which are arranged in the form of two strings 3a and 3b. For the sake of clarity, the string 3b is only indicated here by three dots. Each of the two strings 3a, 3b in this case comprises a series connection of PV modules 2 so that their output voltages add up along the respective string 3a, 3b. The PV modules 2 each comprise a junction box 4, via which the respective PV module 2 is connected to the adjacent PV modules 2 and integrated into the series connection. Not shown is a bypass diode (not shown) accommodated in the junction box 4, which bypasses the respective PV module 2 if required. The junction box 4 has a shutdown apparatus 6, which is stylistically characterized in the figure by the two switches. The shutdown apparatus 6 can be realized by two switches as in the example embodiment shown in the figure, however, it could also be implemented with only one switch and one diode. The component in the junction boxes 4 with the reference number 7 is a reception device 7. Some of the junction boxes 4 also comprise a power-optimizing device 8. This power-optimizing device 8 can be accommodated in the junction box 4 as in the example embodiment illustrated in the figure, however, it can just as well be arranged between the junction box 4 and the string line, for example. In both cases, the power-optimizing device 8 is conceptually referred to as being comprised by the solar module 2.

In the context of this disclosure, the solar module 2 is the arrangement that includes both the solar cell arrangement, including the frame and attachment, and the junction box 4 and, if necessary, the power-optimizing device 8. The PV installation 1 shown also comprises an inverter 11 having a DC-side connection 10 to which the two strings 3a and 3b of the solar generator are connected. The DC-side connection 10 comprises connection terminals 10ap, 10an, 10bp, 10bn. The string 3a is connected by way of both poles to the connection terminals 10ap, 10an and is electrically connected to a link circuit 14 of the inverter 11 via a DC-DC converter 12a. The string 3b is also electrically connected to this link circuit 14 via a DC-DC converter 12b, with the two poles of the string 3b being connected to the connection terminals 10bp and 10bn of the DC-side connection of the inverter 11. However, the disclosure is of course not limited to a PV installation 1 having a two-stage inverter 11 which comprises such DC-DC converters 12a, 12b and the link circuit 14. The string arrangement could just as well be connected to a single-stage inverter without such DC-DC converters. On the AC side, the link circuit 14 is followed by a DC-AC converter having an inverter bridge 15 for converting DC voltage into AC voltage, the inverter bridge being arranged electrically between the link circuit 14 and an AC-side connection 17 of the inverter 11. The inverter 11 is connected to a power supply grid 18 by way of the AC-side connection 17 of the inverter 11. In one embodiment the PV installation 1 also comprises a sensor device 19 with components 19a and 19b, which are arranged in the two power paths of the inverter 11 and set up to measure the voltage and current values provided by the solar generator. A transmission apparatus 20, which is set up to transmit signals via the power line of the strings 3a and 3b, with components 20a and 20b is also included. A control apparatus 22 for controlling the operation of the inverter and an evaluation unit 23 are also shown in the inverter 11. The inverter 11 also comprises an interface 24 for the provision of data by the control apparatus 22. Furthermore, further details of the inverter 11 are not shown for the sake of clarity.

When there is sunlight, the PV modules 2 generate electrical power which is made available as a DC voltage to the inverter 11 at its DC-side connection 10. By activating power semiconductor switches by way of the control apparatus 22, the DC voltage can be converted into a link circuit voltage of the link circuit 14 by means of the DC-DC converters 12a, 12b and by the DC-AC converter into an AC voltage suitable for feeding into the power supply grid 18. To determine an operating parameter that reflects an additional yield of electrical power generated by the power-optimizing devices 8 (optimizers) and consequently monitors at least one overall operation of the power-optimizing devices 8, the control apparatus 22 reads in, via the evaluation unit 23, which can also be integrated into the control apparatus 22 or can be embodied as part of the sensor device, a measured value for a first total electrical power after the control apparatus 22 has sent a shutdown signal via the power line to all reception devices 7 via unidirectional communication using the transmission apparatus 20 and no time period Δt has yet elapsed. The PV modules 2 are set up in such a way that the reception device 7 receives the shutdown signal and provides it to a controller (not shown), which controls the shutdown apparatus 6 and, if present in the respective PV module 2, also the power-optimizing device 8. Based on an identifier of the shutdown signal, the controller recognizes that it is intended for a power-optimizing device 8 that may be present. If present in the PV module, the controller transfers the power-optimizing device 8 from optimizing operation to non-optimizing operation and back to optimizing operation after a time period Δt. After the time period Δt has elapsed, the control apparatus 22 reads in a measured value for a second total power and uses the difference to determine an operating parameter that reflects the current additional yield of electrical power generated by the power-optimizing devices 8. The control apparatus makes the operating parameter available at the interface 24, for example, a remote control room (not shown) via a radio link.

Figure 2:
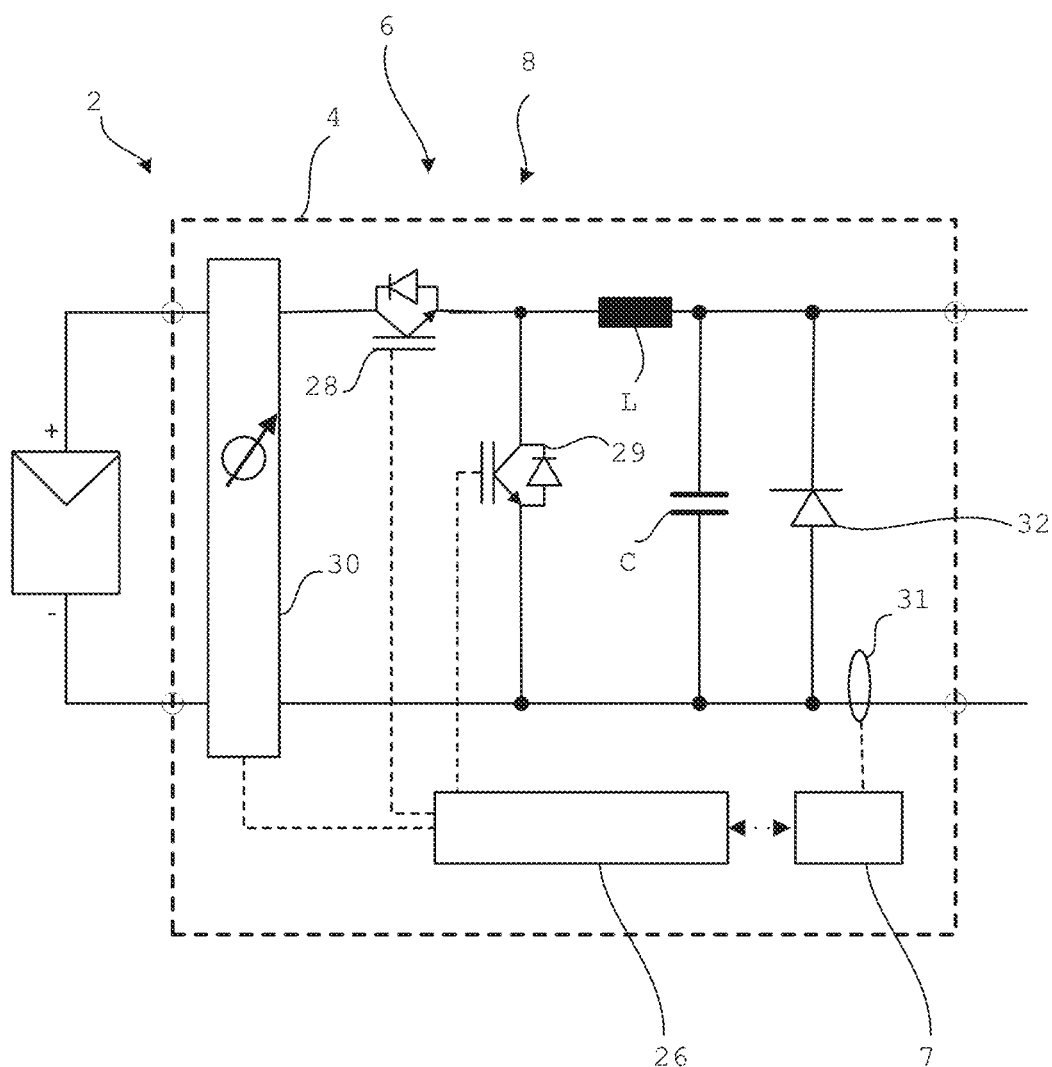

FIG. 2 shows a section of FIG. 1 in the region of a PV module 2 with a junction box 4 shown enlarged according to a second example embodiment of the disclosure in a schematic illustration. In its interior, the junction box 4 comprises a shutdown apparatus 6, a power-optimizing device 8 and a reception device 7, with the power-optimizing device 8 also using the components of the shutdown apparatus 6. The shutdown apparatus 6 comprises the two semiconductor switches 28 and 29 and the controller 26. In one embodiment, the power-optimizing device 8 is configured as a step-down DC-DC converter, which also includes the two semiconductor switches 28 and 29 and the controller 26 and also comprises an inductor L, a capacitor C and a sensor system 30. However, the shutdown apparatus 6 and the power-optimizing device 8 could both just as easily be implemented instead of the switch 29 using only the diode of the switch 29, since their function does not depend on whether the switch is switched or not. The shutdown apparatus 6 and the power-optimizing device 8 also function when the switch 29 is not switched or is replaced by the diode of the switch 29. FIG. 2 thus shows only one possible example embodiment. It should also be mentioned that the switch 28 can also be configured redundantly with two switches in series to increase safety. However, this is not necessary.

The reception device 7 is communicatively connected to the controller 26 and has a sensor system 31 on the power line for picking up command signals. The controller 26 switches the semiconductor switch 28 on and the semiconductor switch 29 off when the shutdown apparatus is in feed-in operation, with the semiconductor switch 28 being operated independently of this in a clocked manner during optimizing operation of the power-optimizing device 8. It should be noted at this point that the on or off switching state of the two semiconductor switches 28 and 29, in one embodiment, relates to the main current path of the semiconductor switches, which can be activated by the controller 26 via the control connection of the semiconductor switches, and does not relate to the current path through the body diode or the diode of the semiconductor switch 28 and 29. When the shutdown apparatus is switched off, the controller 26 switches the semiconductor switch 28 off (and could switch the semiconductor switch 29 on or not), with the controller 26 ensuring that an optimizing operation of the power-optimizing device 8 does not take place in this operating mode of the shutdown apparatus 6. When the shutdown apparatus 6 is in shutdown operation, the two outputs of the junction box 4 are short-circuited via the on semiconductor switch 29 or via the diode of the off semiconductor switch 29 and the capacitor C is also discharged, such that the PV module is de-energized to the outside. When the shutdown apparatus 6 is in feed-in operation, the PV module can be shaded from the other PV modules in the string so that it would not be operated at its MPP operating point given the current in the string. In this case, the sensor system 30 can measure the current and voltage values supplied by the PV module, and the controller 26 can operate the step-down DC-DC converter of the power-optimizing device 8 in optimizing operation in such a way that the PV module operates at its MPP operating point (MPP=Maximum Power Point) independently of a current value in the string.

If the reception device 7 receives a standard shutdown signal for the shutdown apparatus 6 via the line of the power line, the controller 26 switches the semiconductor switch 28 off. At the same time, this switches the power-optimizing device 8 off. If the reception device 7 receives a standard feed-in signal for the shutdown apparatus 6 after a short time, the controller 26 turns the semiconductor switch 28 on for feed-in operation. The controller 26 is set up in such a way that it only activates the semiconductor switch 28 again after a predetermined time period in order to resume the optimizing operation of the power-optimizing device 8.

Figure 3:
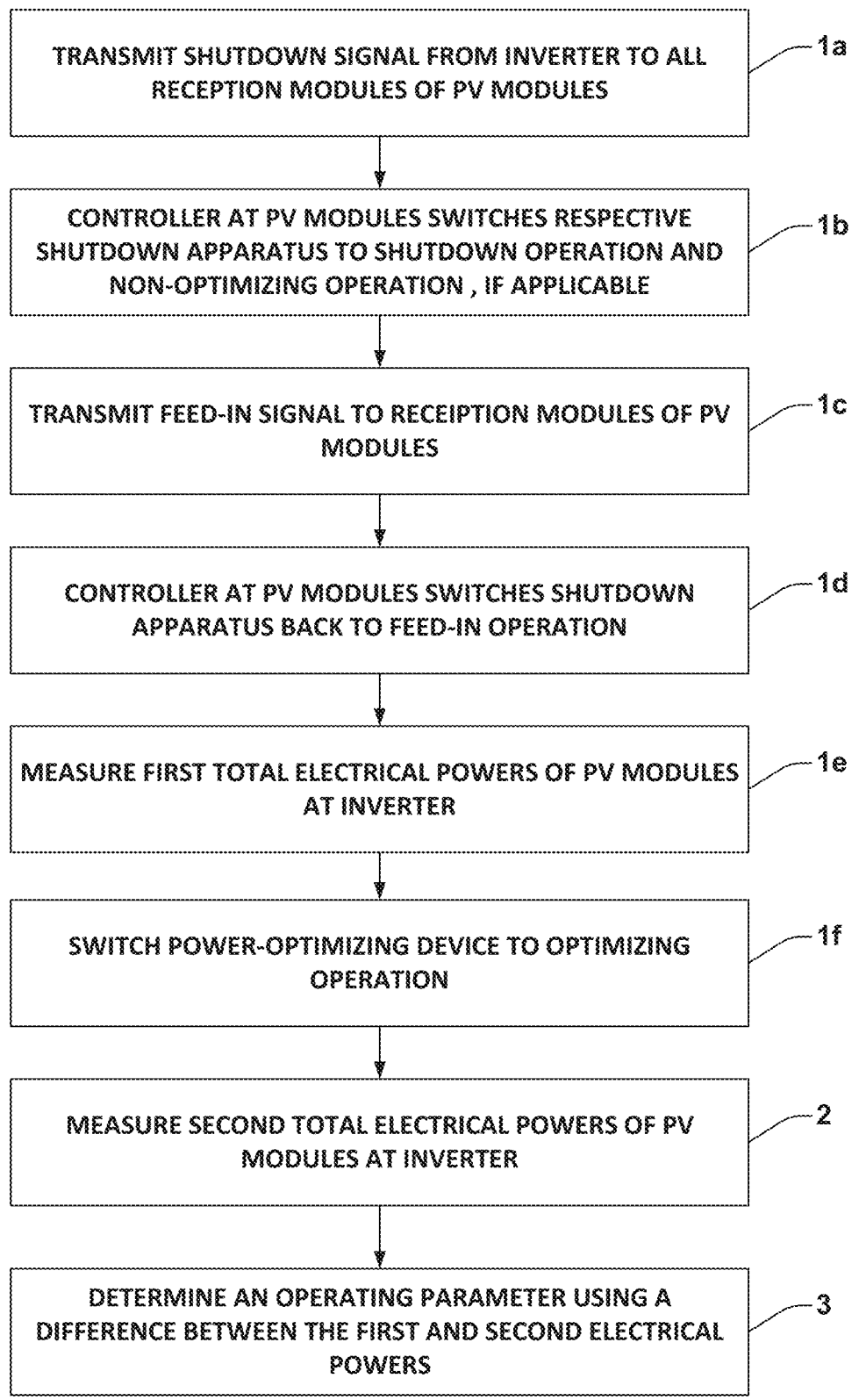
FIG. 3 shows a flowchart of a method according to a third exemplary embodiment of the disclosure.

FIG. 3 shows a flowchart of a method for determining an operating parameter of a PV installation according to a third example embodiment of the disclosure.

The method according to the third exemplary embodiment of the disclosure is carried out using a PV installation having a plurality of PV modules and an inverter, wherein the PV modules each comprise a shutdown apparatus which is communicatively connected to a transmission apparatus of the PV installation and has a feed-in operation and a shutdown operation, wherein at least one PV module is equipped with a power-optimizing device which is set up and configured to set an operating point of the PV module in optimizing operation. In a method act 1a, the transmission apparatus sends a shutdown signal, which is received by all reception devices of the PV modules. In a method act 1b, the reception devices cause a controller of the respective PV module to switch the shutdown apparatuses to shutdown operation and, in the case of PV modules with a power-optimizing device, to switch same to non-optimizing operation. In a method act 1c, the transmission apparatus sends a feed-in signal, which is received by all reception devices of the PV modules. In a method act 1d, the reception devices cause the controller of the respective PV modules to switch the shutdown apparatuses back to feed-in operation and, in the case of PV modules with a power-optimizing device, to switch same to optimizing operation with a time delay in a method act 1f, wherein, before the resumption of the optimizing operation, in a method act 1e, a first total electrical power of the PV modules within the inverter is measured by measuring at least one corresponding voltage value and by measuring at least one corresponding current value. In a method act 2, after the resumption of the optimizing operation of the power-optimizing devices, a second total electrical power of the PV modules is measured by measuring at least one corresponding voltage value and by measuring at least one corresponding current value. Finally, at a method act 3, an operating parameter is determined by a control apparatus of the inverter receiving the measured values by means of the difference between the first and second total electrical power.

What is claimed:

1. A method for determining an operating parameter within a photovoltaic (PV) installation that comprises one or more PV strings each comprising a plurality of series-connected PV modules, wherein the series-connected PV modules each comprise a shutdown apparatus which is communicatively connected to a transmission apparatus of the PV installation and has a feed-in operation and a shutdown operation, wherein at least one PV module within one of the one or more PV strings is equipped with a power-optimizing device which is configured to set an operating point of the PV module in an optimizing operation, the method comprising:

determining a first total electrical power of PV modules within one of the one or more PV strings in a non-optimizing operation of a one of the at least one power-optimizing device that is arranged within the respective one of the one or more PV strings and in the feed-in operation of those shutdown apparatuses arranged within the respective one of the one or more PV strings;

determining a second total electrical power of PV modules within the one of the one or more PV strings in the optimizing operation of the one power-optimizing device that is arranged within the respective one of the one or more PV strings and in the feed-in operation of those shutdown apparatuses arranged within the respective one of the one or more PV strings; and determining the operating parameter within the PV installation that is representative of the one of the one or more PV strings using a difference between the determined first total electrical power and the determined second total electrical power.

2. The method according to claim 1, wherein
determining the first total electrical power of PV modules within the one of the one or more PV strings is performed in the non-optimizing operation for all power-optimizing devices arranged within the respective one of the one or more PV strings; and
determining the second total electrical power of PV modules within the one of the one or more PV strings is performed in the optimizing operation of all power-optimizing devices arranged within the respective one of the one or more PV strings.

3. The method according to claim 1, wherein determining the first total electrical power for the one of the one or more PV strings and determining the second total electrical power for the one of the one or more PV strings are carried out consecutively several times over a period of time, and wherein the operating parameter for the one of the one or more PV strings is determined by means of an average value of respective differences between the first and second total electrical powers of the one of the one or more PV-strings averaged over the period of time.

4. The method according to claim 1, wherein, in determining the first total electrical power, the optimizing operation of all power-optimizing devices arranged within the one of the one or more PV strings is transferred to the non-optimizing operation as a result of a shutdown signal transmitted by the transmission apparatus to all PV modules within the one of the one or more PV-strings, wherein the shutdown signal is received by a reception device of each PV module within the one of the one or more PV strings.

5. The method according to claim 4, further comprising changing shutdown apparatuses of all PV modules within the one of the one or more PV-strings to a shutdown operation in response to the reception of the shutdown signal by the reception devices of the PV modules, and, wherein in a case of any PV modules within the one of the one or more PV strings with a power-optimizing device:
    changing the power-optimizing devices to the non-optimizing operation, and
    sending, via the transmission apparatus, a feed-in signal to all the PV modules within the one of the one or more PV strings, wherein, as a result of a reception of the feed-in signal by the reception devices of the PV modules, changing the shutdown apparatuses to the feed-in operation and
    resuming the optimizing operation after a time delay, wherein the first total electrical power is measured after the change in operation of the shutdown apparatuses back to the feed-in operation and before the change in operation of the power-optimizing devices to the optimizing operation.

6. The method according to claim 4, further comprising maintaining an operation of the shutdown apparatuses of all PV modules within the one of the one or more PV-strings in response to the reception of the shutdown signal by the reception device of the PV modules, wherein, in the case of any PV modules with a power-optimizing device within the one of the one or more PV strings, the PV modules with the power-optimizing device cease the optimizing operation and the first total electric power is measured after the optimizing operation has been ceased and before the optimizing operation is resumed.

7. The method according to claim 1, wherein the PV-installation comprises a plurality of PV-strings, wherein each PV-string comprises at least one PV module that is equipped with a power-optimizing device which is configured to set an operating point of the PV module in the optimizing operation, wherein the determining of the first total electrical power, the determining of the second total electrical power and the determining of the operating parameter representative of the respective PV string is carried out for each of the plurality of PV strings.

8. The method according to claim 7, wherein for each PV string, in determining the first total electrical power, the optimizing operation of all power-optimizing devices arranged within the respective PV string is transferred to the non-optimizing operation as a result of a shutdown signal transmitted by the transmission apparatus to all PV modules within the respective PV string, wherein the shutdown signal is received by a reception device of each PV module within the respective PV string.

9. The method according to claim 8, further comprising for each PV string changing shutdown apparatuses of all PV modules within the respective PV-string to a shutdown operation in response to the reception of the shutdown signal by the reception devices of the PV modules, and, wherein in a case of any PV modules within the respective PV string with a power-optimizing device:
    changing the power-optimizing devices to the non-optimizing operation, and
    sending, via the transmission apparatus, a feed-in signal to all the PV modules within the respective PV string, wherein, as a result of a reception of the feed-in signal by the reception devices of the PV modules, changing the shutdown apparatuses within the respective PV string to the feed-in operation and
    resuming the optimizing operation after a time delay, wherein the first total electrical power is measured after the change in operation of the shutdown apparatuses back to the feed-in operation and before the change in operation of the power-optimizing devices to the optimizing operation.

10. The method according to claim 8, further comprising for each PV string maintaining an operation of the shutdown apparatuses of all PV modules within the respective PV-string in response to the reception of the shutdown signal by the reception device of the PV modules, wherein, in the case of any PV modules within the respective PV string with a power-optimizing device, the PV modules with the power-optimizing device cease the optimizing operation and the first total electric power is measured after the optimizing operation has been ceased and before the optimizing operation is resumed.

11. An inverter for a PV installation comprising one or more PV-strings each comprising a plurality of PV modules, wherein the PV modules each comprise a shutdown apparatus communicatively connected to the inverter, wherein each shutdown apparatus comprises a feed-in operation and a shutdown operation, wherein at least one PV module comprises a power-optimizing device configured to set an operating point of the PV module in an optimizing operation, the inverter comprising:
    a DC-side connection configured to connect to the one or more PV strings,
    an AC-side connection configured to connect to a power supply grid,
    an inverter bridge configured to convert a DC voltage provided at the DC-side connection into an AC voltage for provision to the AC-side connection,
    a transmission apparatus and a control apparatus configured to activate the transmission apparatus and control an operation of the inverter, and wherein the control apparatus is further configured to provide communication as control signals between the inverter and the PV modules via the transmission apparatus, a sensor device configured to measure a total electrical power supplied by the PV modules to the inverter for each of the one or more PV strings, wherein the sensor device is communicatively connected to the control apparatus for transmission of the measured total electrical power to the control apparatus, wherein the inverter is configured to transmit the control signals to the PV modules as instructions to measure the total electrical powers and to determine an operating parameter, and wherein the inverter is configured to:

determine a first total electrical power of the PV modules within one of the one or more PV strings in a non-optimizing operation of a one of the at least one power-optimizing device of the PV modules that is arranged within the respective one of the one or more PV strings and in the feed-in operation of those shutdown apparatuses of the PV modules arranged within the respective one of the one or more PV strings;

determine a second total electrical power of the PV modules within the respective one of the one or more PV strings in the optimizing operation of the one of the at least one power-optimizing device that is arranged within the respective one of the one or more PV strings and in the feed-in operation of the shutdown apparatuses of the PV modules arranged within the respective one of the one or more PV strings; and determine the operating parameter within the PV installation representative of the one of the one or more PV strings using a difference between the determined first total electrical power and the determined second total electrical power.

12. The inverter of claim 11, wherein the inverter is configured to determine the first total electrical power of the PV modules within the one of the one or more PV strings for all of the power-optimizing devices arranged within the respective one of the one or more PV strings operating in the non-optimizing operation; and determine the second total electrical power of the PV modules within the one of the one or more PV strings for all power-optimizing devices arranged within the respective one of the one or more PV strings operating in the optimizing operation.

13. The inverter according to claim 11, further comprising an interface configured to transmit the determined operating parameter.

14. A PV installation having an inverter and one or more PV-strings, each PV-string comprising a plurality of PV modules, wherein the PV modules each comprise a shutdown apparatus communicatively connected to a transmission apparatus of the PV installation, wherein each shutdown apparatus comprises a feed-in operation and a shutdown operation, wherein at least one PV module comprises a power-optimizing device configured to set an operating point of the PV module in an optimizing operation, wherein the PV installation is configured to:

determine a first total electrical power of the PV modules within one of the one or more PV strings in a non-optimizing operation of a one of the at least one power-optimizing device that is arranged within the respective one of the one or more PV strings and in the feed-in operation of the shutdown apparatuses;

determine a second total electrical power of the PV modules within the respective one of the one or more PV strings in an optimizing operation of the one of the at least one power-optimizing device that is arranged within the respective one of the one or more PV strings and in the feed-in operation of the shutdown apparatuses arranged within the respective one of the one or more PV strings; and determine an operating parameter representative of the one of the one or more PV strings using a difference between the determined first total electrical power and the determined second total electrical power.

15. The PV installation according to claim 14, wherein the inverter comprises:

a DC-side connection configured to connect to the one or more PV strings, an AC-side connection configured to connect to a power supply grid, an inverter bridge configured to convert a DC voltage provided at the DC-side connection into an AC voltage for provision to the AC-side connection, a transmission apparatus and a control apparatus configured to activate the transmission apparatus and control the operation of the inverter, and wherein the control apparatus is further configured to provide communication as control signals between the inverter and the PV modules via the transmission apparatus, a sensor device configured to measure a total electrical power supplied by the PV modules to the inverter for each of the one or more PV strings, wherein the sensor device is communicatively connected to the control apparatus for transmission of the measured total electrical power to the control apparatus, wherein the inverter is configured to transmit the control signals to the PV modules as instructions to measure the total electrical power and to determine an operating parameter.

16. An inverter for a PV installation comprising one or more PV-strings each comprising a plurality of PV modules, wherein the PV modules each comprise a shutdown apparatus communicatively connected to the inverter, wherein each shutdown apparatus comprises a feed-in operation and a shutdown operation, wherein at least one PV module comprises a power-optimizing device configured to set an operating point of the PV module in an optimizing operation, the inverter comprising:

a DC-side connection configured to connect to the one or more PV strings, an AC-side connection configured to connect to a power supply grid, an inverter bridge configured to convert a DC voltage provided at the DC-side connection into an AC voltage for provision to the AC-side connection, a transmission apparatus and a control apparatus configured to activate the transmission apparatus and control the operation of the inverter, and wherein the control apparatus is further configured to provide communication as control signals between the inverter and the PV modules via the transmission apparatus, a sensor device configured to measure a total electrical power supplied by the PV modules to the inverter wherein the sensor device is communicatively connected to the control apparatus for transmission of the measured total electrical power to the control apparatus, wherein the inverter is configured to transmit the control signals to the PV modules as instructions to measure the total electrical power and to determine an operating parameter, wherein the inverter is configured to:
  determine a first total electrical power of the PV modules of the one or more PV strings in the non-optimizing operation of the at least one power-optimizing device of the PV modules arranged within the one or more PV strings and in a feed-in operation of the shutdown apparatuses of the PV modules of the one or more PV strings;
  determine a second total electrical power of the PV modules of the one or more PV strings in the optimizing operation of the at least one power-optimizing device arranged within the one or more PV strings and in the feed-in operation of the shutdown apparatuses of the PV modules arranged within the one or more PV strings; and
  determine an operating parameter representative for the PV installation using a difference between the determined first total electrical power and the determined second total electrical power.

17. The inverter according to claim 16, further comprising an interface configured to transmit the determined operating parameter.

18. The PV installation according to claim 14, wherein the PV installation is configured to
  determine the first total electrical power of PV modules within the one of the one or more PV strings for all of the power-optimizing devices arranged within the respective one of the one or more PV strings operating in the non-optimizing operation; and
  determine the second total electrical power of PV modules within the one of the one or more PV strings for all power-optimizing devices arranged within the respective one of the one or more PV strings operating in the optimizing operation.

19. A PV installation having an inverter and one or more PV-strings, each PV-string comprising a plurality of PV modules, wherein the PV modules each comprise a shutdown apparatus communicatively connected to a transmission apparatus of the PV installation, wherein each shutdown apparatus comprises a feed-in operation and a shutdown operation, wherein at least one PV module comprises a power-optimizing device configured to set an operating point of the PV module in an optimizing operation, wherein the PV installation is configured to:
  determine a first total electrical power of the PV modules within the one or more PV strings in a non-optimizing operation of the at least one power-optimizing device arranged within the one or more PV strings and in the feed-in operation of the shutdown apparatuses;
  determine a second total electrical power of the PV modules within the one or more PV strings in the optimizing operation of all the power-optimizing devices arranged within the one or more PV strings and in the feed-in operation of the shutdown apparatuses arranged within the one or more PV strings; and
  determine an operating parameter for the PV-installation using a difference between the determined first total electrical power and the determined second total electrical power.

* * * * *